D. W. BAKER.
ICE PICK.
APPLICATION FILED JUNE 8, 1910.

982,564.

Patented Jan. 24, 1911.

Witnesses

Inventor
Daniel W. Baker
By Victor J. Evans
Attorney

UNITED STATES PATENT OFFICE.

DANIEL W. BAKER, OF PHILLIPSTON, MASSACHUSETTS.

ICE-PICK.

982,564.  Specification of Letters Patent.  Patented Jan. 24, 1911.

Application filed June 8, 1910. Serial No. 565,708.

*To all whom it may concern:*

Be it known that I, DANIEL W. BAKER, a citizen of the United States, residing at Phillipston, in the county of Worcester and State of Massachusetts, have invented new and useful Improvements in Ice-Picks, of which the following is a specification.

This invention relates to improvements in tools such as are employed for cutting ice.

It is well-known, when a single edged cutting tool is driven into one end portion of a cake of ice, for the purpose of dividing the cake into smaller pieces, that the end portion removed frequently breaks oblique to the main piece due to the fact that the cutting implement does not make a straight cut. This occurs more frequently when the ice is cut transverse the planes of freezing and it has been observed that the chief cause for the ice breaking at a point above the lower face of the cake is due to the position the cutting implement occupies, in the hands of the operator relative to the cake. Unless one has considerable practice in breaking ice with a single edged tool, the tool will invariably be held at an angle to the ice with the result that the removed piece will break parallel with the planes of freezing at a point adjacent the center of the cake.

The present invention therefore aims at the production of a tool having for one of its objects the provision of a means which when operating on a cake of ice in a plane transverse the planes of freezing, will form an incision into the said cake at right angles to the planes of freezing, the incision just formed being of such depth as to constitute a guide, so that when the ice is tapped with a single edged tool, it will be impossible for the said single edged tool to penetrate the ice in any other way, but at right angles to the planes of freezing, whereby a straight cut will be made through the body of the ice.

With these and other objects in view, which will more fully hereinafter appear, the present invention consists in certain novel details of construction and arrangement of parts, hereinafter fully described, illustrated in the accompanying drawings, and more particularly pointed out in the appended claims.

Figure 1:
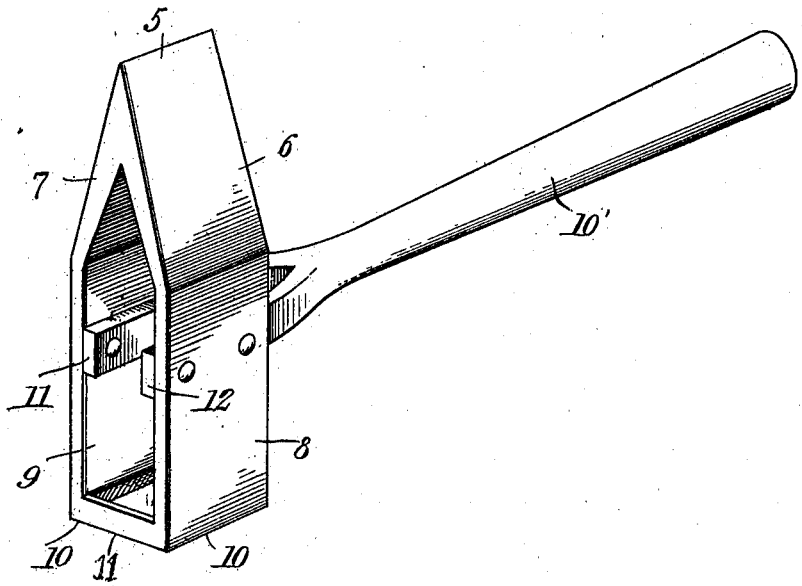
Figure 2:
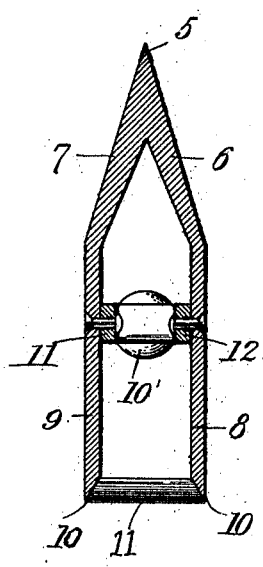

In the accompanying drawings, forming part of the specification;—Figure 1 is a perspective view of the device. Fig. 2 is a vertical sectional view of the same.

Similar numerals of reference are employed to designate corresponding parts throughout.

The device includes in its construction a head, said head being formed of a single casting and comprising opposite side portions, the said side portions being oblong in contour and rectangular in cross section and joined together at one end as shown at 5. The side members diverge for portions of their length as shown at 6 and 7 and terminate in parallel portions 8 and 9, the free ends of which are ground to provide cutting edges as shown at 10, the connected ends of the side members being likewise ground to provide a cutting edge.

A handle is designated by the numeral 10' and is divided at one end for a short distance, in the direction of its length so as to provide prongs 11 and 12, which are flexed outwardly and fixedly secured adjacent to the middles of the parallel portions 8 and 9 and on the opposed inner faces thereof, it being understood that the body of the handle will extend at right angles to the head as shown in the drawings.

By reference now to the drawings it will be seen that the outer corners of the side members are connected by a cross piece 11', the lower edge of which is sharpened and in a plane with the edges of the sides 9 and 10.

With this construction it will be manifest when incisions are made in a cake of ice by means of the cutting edges on the parallel side portions 8 and 9, said incisions will, when the cake is operated upon in a direction transverse the planes of freezing, be at right angles to the planes of freezing, and the said incisions will be of such depth that when the position of the head is reversed by turning the handle 10' and the wedge-shaped end formed by the diverging portions 6 and 7 forced into the said incisions the sides of the latter will act as a guide so that the sharpened edge of the wedge-shaped end will cut at right angles the planes of freezing, whereby the cake will be severed on a straight line.

It will be further observed, that the cross piece 11' will serve the purpose of a scraper for removing the chips from the incision made by the edges of the sides and cross piece.

I claim:—

1. An ice cutting tool comprising a head wedge-shaped at one end and having at its opposite end spaced and parallel side portions the free ends of which are sharpened, a sharpened cross piece connecting the outer sides of the said free ends, and a handle secured to said head.

2. In an ice-cutting tool, a head including a pair of side portions fixedly secured together at one end and diverging for a portion of their length and terminating in parallel portions, the free ends of which are sharpened, a cross blade connecting the outer sides of the parallel portions and having its cutting edge in a plane with the sharpened free ends of the said parallel portions, and a handle secured to the said parallel portions.

3. In an ice-cutting tool, a head including a pair of side members, fixedly secured together at one end and sharpened to provide a cutting edge, the said side members diverging for a portion of their length and terminating in spaced parallel portions, the free ends of which are sharpened, and a handle divided at one end in the direction of its length and secured to the opposed inner faces of the said parallel portion.

In testimony whereof I affix my signature in presence of two witnesses.

DANIEL W. BAKER.

Witnesses:
GEO. R. WARFIELD,
HELEN HINES.